United States Patent
Colvin et al.

(10) Patent No.: US 7,790,799 B2
(45) Date of Patent: Sep. 7, 2010

(54) REINFORCED SILICA/ELASTOMER COMPOSITE

(75) Inventors: Howard Allen Colvin, Arlington, TX (US); Sun Lin Chen, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 664 days.

(21) Appl. No.: 11/891,399

(22) Filed: Aug. 10, 2007

(65) Prior Publication Data

US 2007/0272339 A1    Nov. 29, 2007

Related U.S. Application Data

(62) Division of application No. 10/021,200, filed on Dec. 7, 2001, now Pat. No. 7,276,550.

(60) Provisional application No. 60/250,042, filed on Dec. 29, 2000.

(51) Int. Cl.
  *B60C 1/00*    (2006.01)
  *C08K 3/34*    (2006.01)
  *C08K 3/04*    (2006.01)
  *C08K 9/00*    (2006.01)

(52) U.S. Cl. .................. 524/493; 524/495; 523/215; 523/216

(58) Field of Classification Search .................. 524/493, 524/495; 523/215, 216
See application file for complete search history.

(56) References Cited

U.S. PATENT DOCUMENTS

| | | | |
|---|---|---|---|
| 2,880,191 A | 3/1959 | Newton et al. ............... 523/210 |
| 2,885,381 A | 5/1959 | Svetlik | |
| 5,036,133 A | 7/1991 | Coran ......................... 524/526 |
| 6,075,084 A | 6/2000 | Mabry et al. ................. 524/495 |
| 6,378,582 B1 | 4/2002 | Sandstrom et al. ........ 152/209.1 |
| 6,417,246 B1 | 7/2002 | Jia et al. ...................... 523/113 |
| 6,479,582 B1 * | 11/2002 | Hareyama et al. ............ 524/784 |
| 6,750,273 B2 * | 6/2004 | Chao ........................... 523/212 |

\* cited by examiner

*Primary Examiner*—Nathan M Nutter
(74) *Attorney, Agent, or Firm*—Alvin T. Rockhill

(57) ABSTRACT

This invention is based upon the discovery that elongated silica has superior characteristics for reinforcing rubbery elastomers as compared to conventional silica. More specifically, elongated silica provides a higher level of reinforcement for elastomers at the same level of loading. Accordingly, elongated silica can be employed to attain an equivalent level of reinforcement at a lower level of loading. This results in lower weight compositions and potential cost savings. Rubber compounds that are reinforced with elongated silica offer significant advantages in tires including reduced rolling resistance, increased tread life, and, of course, reduced weight. The subject invention more specifically relates to a tire having a tread wherein said tread is comprised of a silica reinforced rubber composition, wherein the silica reinforced rubber composition is comprised of (1) a rubbery polymer and (2) an elongated silica, wherein the elongated silica has a width that is within the range of about 5 nm to about 40 nm, and wherein the elongated silica has a length of about 40 nm to about 300 nm. The present invention also discloses a process for preparing a silica reinforced rubber composition which comprises (1) adding an elongated silica to a latex of a rubbery polymer, and (2) recovering the silica reinforced rubber composition from the latex.

20 Claims, No Drawings

REINFORCED SILICA/ELASTOMER COMPOSITE

This is a divisional of U.S. patent application Ser. No. 10/021,200, filed on Dec. 7, 2001 now U.S. Pat. No. 7,276,550, which claims the benefit of U.S. Provisional Application Ser. No. 60/250,042, filed on Dec. 29, 2000.

BACKGROUND OF THE INVENTION

Tires are increasingly expected to provide higher and higher levels of performance. For instance, it is normally expected for tires to exhibit good traction on both dry and wet surfaces as well as low rolling resistance for good vehicle fuel economy. However, it has traditionally been very difficult to improve the traction characteristics of a tire without compromising its rolling resistance and treadwear. Low rolling resistance is important because good fuel economy is virtually always an important consideration. Reducing the weight of tires is also a goal of automobile and truck manufacturers because reduced weight results in improved fuel economy. Reducing the weight of tires is of particular importance in the case of aircraft tires. Good treadwear is also an important consideration because it is generally the most important factor in determining the life of the tire.

The traction, treadwear and rolling resistance of a tire is dependent to a large extent on the dynamic viscoelastic properties of the elastomers utilized in making the tire tread. In order to reduce the rolling resistance of a tire, rubbers having a high hot rebound have traditionally been utilized in making the tire's tread. On the other hand, in order to increase the wet skid resistance of a tire, rubbers that undergo a large energy loss have generally been utilized in the tire tread. In order to balance these two inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

Rubbers having intermediate glass transition temperatures (−70° C. to −40° C.) compromise rolling resistance and treadwear without significantly increasing traction characteristics. For this reason, blends of rubbers having low glass transition temperatures and rubbers having high glass transition temperatures are frequently utilized to attain improved traction characteristics without significantly compromising rolling resistance or treadwear. However, such blends of rubbers having low glass transition temperatures and rubbers normally having high glass transition temperatures exhibit poor processability. This major disadvantage associated with such blends has greatly hampered their utilization in making tire tread compounds.

U.S. Pat. No. 2,885,381 discloses a composition of matter comprising a copolymer of a conjugated diene and a heterocyclic nitrogen containing monomer having a sole $CH_2=CH-$ substituent, such as 2-vinylpyridine, said copolymer having been compounded with 25-100 weight parts per 100 parts of said copolymer of a finely ground mineral pigment selected from the group consisting of silica and aluminum silicate as the sole reinforcing agent.

In recent years, there has been a trend to include silica as a filler in tire tread compounds to further improve traction characteristics. U.S. Pat. No. 5,036,133 discloses a vulcanizable rubber composition that is comprised of: (A) an uncured natural or synthetic isoprene rubber, or one or more uncured butadiene-based synthetic rubbers, or uncured blends thereof, said uncured rubbers being sulfur vulcanizable, (B) a silica filler, (C) sulfur, (D) an organic accelerator and (E) a vinylpyridine-butadiene interpolymer co-activator, said interpolymer co-activator (E) containing from about 20 percent to about 65 percent by weight of vinylpyridine units, the amount of said vinylpyridine-butadiene copolymer co-activator being from about 0.5 to 2 parts by weight per 100 parts by weight of said rubber.

SUMMARY OF THE INVENTION

This invention is based upon the discovery that elongated silica has superior characteristics for reinforcing rubbery elastomers as compared to conventional silica. More specifically, elongated silica provides a higher level of reinforcement for elastomers at the same level of loading. Accordingly, elongated silica can be employed to attain an equivalent level of reinforcement at a lower level of loading. This results in lower weight compositions and potential cost savings. Rubber compounds that are reinforced with elongated silica offer significant advantages in tires including reduced rolling resistance, increased tread life, and, of course, reduced weight.

The subject invention more specifically relates to a silica reinforced rubber composition which is comprised of (1) a rubbery polymer and (2) an elongated silica, wherein the elongated silica has a width that is within the range of about 5 nm to about 40 nm and wherein the elongated silica has a length of about 40 nm to about 300 nm.

The present invention also discloses a process for preparing a silica reinforced rubber composition which comprises (1) adding an elongated silica to a latex of a rubbery polymer, and (2) recovering the silica reinforced rubber composition from the latex.

DETAILED DESCRIPTION OF THE INVENTION

The rubbery polymers that can be reinforced with elongated silica in accordance with this invention are normally comprised of repeat units that are derived from a conjugated diene monomer and optionally additional monomers that are copolymerizable with the conjugated diolefin monomer, such as vinyl aromatic monomers. These rubbery polymers typically have a glass transition temperature of less than 0° C., preferably less than −10° C. Such rubbery polymers can be synthesized using solution polymerization or emulsion polymerization techniques. However, it is normally preferred for the rubbery polymer to be synthesized by batch or continuous emulsion polymerization using a free radical initiator system. This is carried out by adding the conjugated diolefin monomer, water, a free radical generator, and a soap system to a polymerization zone to form an aqueous polymerization medium. The polymerization zone will normally be a reactor or series of two or more reactors. Polymerization is initiated with the free radical generator. This polymerization reaction results in the formation of a latex of the polydiene rubber that is comprised of repeat units that are derived from the conjugated diene monomer and any additional monomers that are copolymerized therewith.

The conjugated diolefin monomer will generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Other ethylenically unsaturated monomers can also be copolymerized into the polydiene rubber. Some representative examples of additional ethylenically unsaturated monomers that can potentially be synthesized into the polydiene rubber include alkyl acrylates, such as methyl acrylate, ethyl acrylate, butyl acrylate, methyl methacrylate, and the like; vinyl halides, such as 1,1-dichloroethene (vinylidene chloride), 1,2-dichloroethene, and the like; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide, and the like.

The polydiene rubber can be a copolymer of one or more conjugated diene monomers with one or more other ethylenically unsaturated monomers. Such polydiene rubbers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in the asphalt compositions of this invention. In such cases, the polydiene rubber will, of course, also contain repeat units that are derived from sulfur.

Vinyl aromatic monomers are probably the most important group of ethylenically unsaturated monomers that can be incorporated into the polydiene rubbers employed in this invention. Such vinyl aromatic monomers are, of course, selected so as to be copolymerizable with the conjugated diolefin monomers being utilized. Generally, any vinyl aromatic monomer that is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene, and the like. Copolymer rubbers of 1,3-butadiene and styrene are particularly preferred.

In synthesizing styrene-butadiene rubber (SBR) latex generally from about 10 weight percent to about 40 weight percent styrene and from about 60 weight percent to about 90 weight percent 1,3-butadiene are copolymerized. It is typically preferred for the SBR to contain from about 20 weight percent to about 30 weight percent styrene and from about 70 weight percent to about 80 weight percent 1,3-butadiene. It is normally most preferred for the SBR to contain from about 24 weight percent to about 28 weight percent styrene and from about 72 weight percent to about 76 weight percent 1,3-butadiene. Like ratios of styrene monomer and butadiene monomer will accordingly be charged into the polymerization zone.

Monomers containing nitrogen can also optionally be copolymerized into the rubbery polymer. The nitrogen group containing monomer will typically also contain a vinyl group ($CH_2=CH_2-$). Some representative examples of nitrogen group-containing vinyl monomers include polymerizable monomers having at least one amino group selected from the group consisting of primary, secondary and tertiary amino groups in their molecules. Additionally, the nitrogen may in the form of an amide. Of these, tertiary amino group-containing vinyl monomers are particularly preferred. These amino group-containing vinyl monomers may be used either singly or in any combination thereof.

Examples of the primary amino group-containing vinyl monomers include, p-aminostyrene, aminomethyl(meth)acrylate, aminoethyl(meth)acrylate, aminopropyl(meth)acrylate and aminobutyl(meth)acrylate. Examples of secondary amino group-containing vinyl monomers include anilinostyrenes and anilinophenylbutadienes.

Examples of tertiary amino group-containing vinyl monomers include N,N-disubstituted aminoalkyl acrylates, N,N-disubstituted aminoalkyl acrylamides, N,N-disubstituted amino-aromatic vinyl compounds and vinyl compounds having a pyridyl group.

Examples of the N,N-disubstituted amino alkyl acrylates include esters of acrylic acid or methacrylic acid, such as N,N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl(meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl(meth)acrylate, N,N-dibutylaminoethyl(meth)acrylate, N,N-dibutylaminopropyl(meth)acrylate, N,N-dibutylaminobutyl(meth)acrylate, N,N-dihexylaminoethyl(meth)acrylate, and N,N-dioctylaminoethyl(meth)acrylate.

Examples of the N,N-disubstituted aminoalkyl acrylamides include acrylamide compounds or methacrylamide compounds such as N,N-dimethylaminomethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl(meth)acrylamide, N,N-dibutylaminoethyl(meth)acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide and N,N-dioctylaminopropyl(meth)acrylamide. Of these, N,N-dimethylaminopropyl(meth)acrylamide, N,N-diethylaminopropyl(meth)acrylamide and N,N-dioctylaminopropyl(meth)acrylamide are preferred.

Example of the N,N-disubstituted amino-aromatic vinyl compounds include styrene derivatives such as N,N-dimethylaminoethylstyrene, N,N-diethylaminoethylstyrene, N,N-dipropylaminoethylstyrene and N,N-dioctylaminoethylstyrene.

Examples of the pyridyl group-containing vinyl compounds include 2-vinylpyridine, 4-vinylpyridine, 5-methyl-2-vinylpyridine and 5-ethyl-2-vinylpyridine. Of these pyridyl group-containing vinyl monomers, 2-vinylpyridine which has the structural formula:

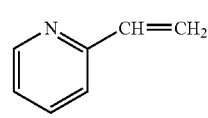

and 4-vinyl pyridine which has the structural formula:

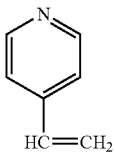

are preferred. The most preferred pyridyl group-containing monomer is 2-vinylpyridine. Amino group containing monomers that contain more that one amino group can be used. Some representative examples of such monomers include 2-vinyl pyrimidine which has the structural formula:

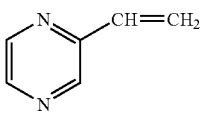

and 2-vinyl 1,3,5-triazine which has the structural formula:

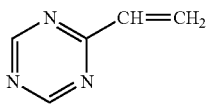

The amino group containing rubber will typically contain from about 0.1 weight percent to about 20 weight percent of the amino group containing monomer. In other words, repeat units in the amino group containing rubber are derived from the amino group containing monomer. In any case, it is normally preferred for the amino group containing rubber to contain from about 0.5 weight percent to about 10 weight percent of the amino group containing monomer. It is typically more preferred for the amino group containing rubber to contain from about 1 weight percent to about 4 weight percent of the amino group containing monomer.

In another embodiment of this invention a hydroxy alkyl acrylate monomer is copolymerized into the rubbery polymer. In such cases, the bound hydroxy alkyl acrylate monomer will typically be present in the rubbery polymer at a level which is within the range of about 0.1 weight percent to about 15 weight percent. The hydroxy alkyl acrylate monomer will more typically be included at a level that is within the range of about 0.5 weight percent to about 10 weight percent. The hydroxy alkyl acrylate monomer will preferably be included at a level that is within the range of about 1 weight percent to about 8 weight percent. The hydroxy alkyl acrylate monomer will more preferably be included at a level which is within the range of about 3 weight percent to about 5 weight percent.

The hydroxy alkyl acrylate monomers that can be used typically have a structural formula selected from the group consisting of:

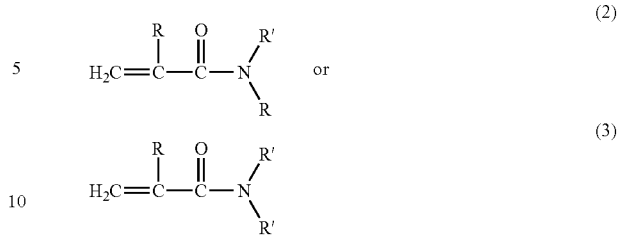

wherein R represents hydrogen atoms or an alkyl groups containing from 1 to about 8 carbon atoms, and wherein R' represents hydroxyalkyl groups containing from about 2 to about 8 carbon atoms. It is preferred for R to be a hydrogen atom or an alkyl group containing from 1 to about 4 carbon atoms. It is more preferred for R to be a hydrogen atom or a methyl group. It is most preferred for R to represent a methyl group. It is preferred for R' to represent a hydroxyalkyl group containing from about 2 to about 4 carbon atoms. It is more preferred for R' to be a hydroxypropyl group.

Some representative hydroxy alkyl acrylate monomers that can be used include 2-hydroxyethyl(meth)acrylate, 2-hydroxypropyl(meth)-acrylate, 3-hydroxypropyl(meth)acrylate, 3-chloro-2-hydroxypropyl(meth)acrylate, 3-phenoxy-2-hydroxypropyl(meth)acrylate, glycerol mono(meth)acrylate, hydroxybutyl(meth)acrylate, 3-chloro-2-hydroxypropyl (meth)-acrylate, hydroxyhexyl(meth)acrylate, hydroxyoctyl (meth)acrylate, hydroxymethyl(meth)acrylamide, 2-hydroxyethyl(meth)acrylamide, 2-hydroxypropyl(meth)-acrylamide, 3-hydroxypropyl(meth)acrylamide, di-(ethylene glycol)itaconate, di-(propylene glycol)itaconate, bis(2-hydroxypropyl)itaconate, bis(2-hydroxyethyl)itaconate, bis(2-hydroxyethyl)fumarate, bis(2-hydroxy-ethyl)maleate, and hydroxy-methyl vinyl ketone. The preferred hydroxy alkyl acrylate monomers are hydroxymethyl(meth)acrylate, 2-hydroxyethyl(meth)-acrylate, 2-hydroxypropyl(meth)acrylate, 3-hydroxy-propyl(meth)acrylate, 3-phenoxy-2-hydroxypropyl(meth)acrylate, glycerol mono(meth)acrylate, hydroxybutyl(meth)acrylate, hydroxyhexyl(meth)acrylate, hydroxyoctyl(meth)acrylate, hydroxymethyl(meth)acrylamide, 2-hydroxyethyl(meth)acrylamide, 2-hydroxypropyl-(meth) acrylamide, and 3-hydroxypropyl(meth)acrylamide. Of these, particularly preferred are hydroxymethyl(meth)acrylate, 2-hydroxyethyl(meth)acrylate, and 3-hydroxypropyl (meth)acrylate. The most highly preferred hydroxy alkyl acrylate monomer is hydroxypropylmethacrylate. These hydroxyl group-containing monomers can be used singly or in combination. For instance, a mixture of 2-hydroxypropylmethacrylate and 3-hydroxypropylmethacrylate can be utilized.

Essentially any type of free radical generator can be used to initiate the free radical emulsion polymerization. For example, free radical generating chemical compounds, ultraviolet light or radiation can be used. In order to ensure a satisfactory polymerization rate, uniformity, and a controllable polymerization, free radical generating chemical agents which are water or oil soluble under the polymerization conditions are typically used.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like.

The amount of initiator employed will vary with the desired molecular weight of the rubbery polymer being synthesized. Higher molecular weights are achieved by utilizing smaller quantities of the initiator and lower molecular weights are attained by employing larger quantities of the initiator. However, as a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

A wide variety of soap systems can be used to emulsify the polymerization medium. For instance, an anionic, cationic or non-ionic emulsifier can be employed. A combination of rosin acid and fatty acid emulsifiers can be employed with excellent results. In such systems, the weight ratio of fatty acid soaps to rosin acid soaps will be within the range of about 50:50 to 90:10. It is normally preferred for the weight ratio of fatty acid soaps to rosin acid soaps to be within the range of 60:40 to 85:15 All of the soap is charged into the first polymerization zone in practicing this invention. The total amount of soap employed will normally be within the range of about 1 phm to 5 phm. It is typically preferred to utilize a level of soap that is within the range of about 2 phm to about 3.5 phm. In most cases it will be most preferred to use an amount of the soap system which is within the range of about 2.5 phm to 3 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 20° F. (−7° C.) to about 80° F. (27° C.). It is generally preferred for the polymerization to be carried out at a temperature that is within the range of 30° F. (−1° C.) to about 65° F. (18° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

The polymerizations employed in making the polydiene rubber are typically initiated by adding the initiator to the aqueous polymerization medium that contains the monomers, water and emulsifier. Such polymerizations are typically carried out utilizing continuous polymerization techniques. In such continuous polymerizations, monomer and initiator are continuously added to the polymerization medium with a latex of the polydiene rubber being continuously withdrawn. Such continuous polymerizations are typically conducted in a multiple reactor system. After the desired monomer conversion is reached a short stop, such as a sodium salt of a dithiocarbamate and/or hydroxylamine, is added to the latex to terminate the polymerization.

After the polymerization has been terminated the elongated silica can be added to the latex. The elongated silica will normally be added to the latex in the form of a silicasol and is well dispersed throughout the latex by mixing and/or agitation. The elongated silica will typically have a width of about 5 nm to about 20 nm and a length of about 40 nm to about 300 nm. The elongated silica will more typically have a length of about 70 nm to about 120 nm. The elongated silica will preferably have a length of about 80 nm to about 1020 nm. Elongated silica that is suitable for use in this invention is commercially available from Nissan Chemical Industries, Ltd., and is sold as Snowtex® silicasol. Snowtex® UP silicasol and Snowtex® PS silicasol are representative examples of elongated silicas that can be used in the practice of this invention. The elongated silica will typically be added in an amount which is within the range of about 20 phr to about 70 phr. The elongated silica will more typically be added in an amount which is within the range of about 30 phr to about 60 phr. The elongated silica will preferably be added in an amount which is within the range of about 35 phr to about 55 phr. Elongated silicasols that are useful in the practice of this invention can be made by the technique described by Ralph K. Iler, The Chemistry of Silica, Solubility, Polymerization, Coloid and Surface Properties, and Biochemistry, page 330, John Wiley & Sons (1979).

The silica containing rubber composition can then be recovered from the latex using standard coagulation and drying techniques. The silica containing rubber composition can then be employed in manufacturing tires and a wide variety of other rubber articles having improved performance characteristics. There are valuable benefits associated with utilizing the silica containing rubber compositions of this invention in making tire tread compounds. Such tire tread compounds will, of course, contain other rubbers which are co-curable with the silica containing emulsion rubber composition of this invention. Some representative examples of such rubbers include natural rubber, high cis-1,4-polybutadiene rubber, high vinyl polybutadiene rubber, medium vinyl polybutadiene rubber, high trans-1,4-polybutadiene rubber, solution styrene-butadiene rubber, styrene-isoprene-butadiene rubber, styrene-isoprene rubber, isoprene-butadiene rubber and 3,4-polyisoprene rubber The cis-1,4-polybutadiene rubber employed in such blends will typically have a cis-1,4-isomer content of at least about 90 percent and will more typically have a cis-1,4-isomer content of at least about 95 percent. High cis-1,4-polybutadiene rubber which is suitable for use in such blends typically has a cis-isomer content of greater than 90 percent and can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Budene® 1208 polybutadiene rubber. Tire tread compounds having extremely useful characteristics can also be made by including 3,4-polyisoprene in the blend.

The silica containing rubber compositions of this invention can be compounded utilizing conventional ingredients and standard techniques. For instance, such rubber blends will typically be mixed with carbon black and/or conventional silica, sulfur, fillers, accelerators, oils, waxes, scorch inhibiting agents and processing aids. In most cases, the emulsion SBR blend will be compounded with sulfur and/or a sulfur-containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur-containing compound with 1 phr to 2.5 phr being preferred. It may be desirable to utilize insoluble sulfur in cases where bloom is a problem.

In any case, it will be highly advantageous to include an organosilicon compound (silica coupling agent) to realize maximum benefits. Examples of suitable sulfur-containing organosilicon compounds are of the formula:

$$Z\text{-Alk-}S_n\text{-Alk-}Z \qquad (I)$$

in which Z is selected from the group consisting of

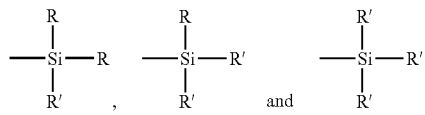

where R is an alkyl group of 1 to 4 carbon atoms, cyclohexyl or phenyl; wherein R' is an alkoxy group containing 1 to 8 carbon atoms or a cycloalkoxy group containing 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis (diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis (butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur-containing organosilicon compounds are the 3,3'-bis(trimethoxy or triethoxysilylpropyl)sulfides. The most preferred compound is 3,3'-bis(triethoxysilylpropyl)disulfide. Therefore, as to Formula I, preferably Z is

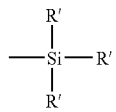

where R' is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is 2.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

In addition to the sulfur-containing organosilicon, the rubber composition should contain a sufficient amount of silica, and carbon black, if used, to contribute a reasonably high modulus and high resistance to tear. If carbon black is also present, the amount may vary. Generally speaking, the amount of carbon black will vary from about 0 phr to about 80 phr. Preferably, the amount of carbon black will range from about 0 phr to about 40 phr. It is to be appreciated that the silica coupler may be used in conjunction with a carbon black; namely, pre-mixed with a carbon black prior to addition to the rubber composition and such carbon black is to be included in the aforesaid amount of carbon black for the rubber composition formulation. In any case, the total quantity of silica and carbon black will be at least about 30 phr.

The commonly employed siliceous pigments used in rubber compounding applications can be used as the silica in this invention, including pyrogenic and precipitated siliceous pigments (silica), although precipitated silicas are preferred. The siliceous pigments preferably employed in this invention are precipitated silicas such as, for example, those obtained by the acidification of a soluble silicate; e.g., sodium silicate. The silica may also be typically characterized by having a dibutylphthalate (DBP) absorption value in a range of about 100 to about 400, and more usually about 150 to about 300.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur-containing organosilicon, and carbon black if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The silica containing tire tread compounds of this invention can be used in tire treads in conjunction with ordinary tire manufacturing techniques. Tires are built utilizing standard procedures with the silica containing rubber composition of this invention being substituted for a portion of the rubber typically used in the tread rubber. After the tire has been built, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

This invention is illustrated by the following examples that are merely for the purpose of illustration and are not to be regarded as limiting the scope of the invention or the manner in which it can be practiced. Unless specifically indicated otherwise, all parts and percentages are given by weight.

Example 1

In this series of experiments latex samples of a styrene-butadiene rubber having a solids content of 20-22 percent were blended with silica. In the procedure used a 3,3'-bis(triethoxysilylpropyl)disulfide/oil emulsion was made by mixing 1.71 phr (parts per hundred parts of rubber) of silane, 10 phr of oil, 6.4 phr of water, and 0.5 phr of soap in a high speed mixer. Then the silane/oil, 42.86 phr of a silicasol or precipitated silica slurry (see Table I), and 1 phr of an antioxidant emulsion were mixed into 100 parts by weight of the latex. The latex was subsequently coagulated at room temperature by the addition of a polyamine. The polymer, silica, and other ingredients formed coagulum and precipitated rapidly to the bottom of the contained used leaving a clear serum at the top. The polymer was washed several times with water, filtered, and dried in a forced air oven at 60° C. for about 10 hours. The polymer was then milled into sheets and tested for physical properties. The samples were tested for reinforcement using a RPA200 strain sweep at 70° C. The results of this evaluation are shown in Table I with G' being shown in kPa. Txiosil is precipitated silica having a particle size of 165 nm, SN-40 is spherical silicasol having a particle size of 10-20 nm, SN-50 is spherical silicasol having a particle size of 20-30 nm, SN-YL is spherical silicasol having a particle size of 59 nm, SN-Z is spherical silicasol having a particle size of 70-100 nm, SN-UPO is a acidic elongated silicasol having a particle size of 5-20 nm×40-300 nm, and SN-UP is silicasol having a particle size of 5-20 nm×40-300 nm.

TABLE I

| Strain (%) | Txiosil | SN-40 | SN-50 | SN-YL | SN-Z | SN-UPO | SN-UP |
|---|---|---|---|---|---|---|---|
| 0.98 | 996 | 230 | 77 | 66 | 71 | 984 | 1377 |
| 1.95 | 590 | 224 | 87 | 77 | 82 | 921 | 1325 |
| 5.02 | 489 | 216 | 92 | 78 | 80 | 754 | 1028 |
| 10.04 | 395 | 196 | 89 | 76 | 78 | 594 | 729 |
| 19.95 | 295 | 163 | 80 | 71 | 74 | 417 | 468 |
| 49.94 | 175 | 112 | 62 | 61 | 62 | 228 | 235 |
| 100.2 | 104 | 73 | 44 | 44 | 44 | 131 | 131 |
| 200.04 | 60 | 41 | 26 | 27 | 26 | 72 | 69 |
| 499.97 | 33 | 18 | 12 | 12 | 11 | 33 | 30 |
| 999.94 | 23 | 11 | 7 | 7 | 6 | 17 | 16 |

As can be seen from Table I, the elongated Snowtex silicas (SN-UPO and SN-UP) provided a much higher level of reinforcement than did the Snowtex spherical silicas at all strain levels.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a silica reinforced rubber composition which comprises (1) adding an elongated silica to a latex of a rubbery polymer, wherein the elongated silica has a width that is within the range of about 5 nm to about 40 nm, and wherein the elongated silica has a length of about 40 nm to about 300 nm, and (2) recovering the silica reinforced rubber composition from the latex.

2. A process as specified in claim 1 wherein the elongated silica is added in an amount which is within the range of about 20 phr to about 70 phr.

3. A process as specified in claim 1 wherein the elongated silica is added in an amount which is within the range of about 30 phr to about 60 phr.

4. A process specified in claim 1 wherein the elongated silica is added in an amount which is within the range of about 35 phr to about 55 phr.

5. A process as specified in claim 1 wherein the elongated silica has a length of about 70 nm to about 120 nm.

6. A process as specified in claim 1 wherein the elongated silica has a length of about 80 nm to about 100 nm.

7. A process as specified in claim 1 wherein the rubbery polymer is a styrene-butadiene rubber.

8. A process as specified in claim 1 which further comprises mixing a sulfur-containing organosilicon compound and carbon black into the silica reinforced rubber composition in a non-productive thermomechanical mixing step to produce a non-productive silica reinforced rubber composition.

9. A process a specified in claim 8 which further comprises mixing a sulfur-vulcanizing agent into the non-productive silica reinforced rubber composition in a subsequent productive mixing step.

10. A process as specified in claim 8 wherein the thermomechanical mixing step produces a rubber temperature which is within the range of 140° C. to 190° C.

11. A tire having a tread wherein said tread is comprised of a silica reinforced rubber composition, wherein the silica reinforced rubber composition is comprised of (1) a rubbery polymer and (2) an elongated silica, wherein the elongated silica has a width that is within the range of about 5 nm to about 40 nm, and wherein the elongated silica has a length of about 40 nm to about 300 nm.

12. A tire as specified in claim 11 wherein the elongated silica is present at a level which is within the range of about 20 phr to about 70 phr.

13. A tire as specified in claim 11 wherein the elongated silica is present at a level which is within the range of about 30 phr to about 60 phr.

14. A tire as specified in claim 11 wherein the elongated silica is present at a level which is within the range of about 35 phr to about 55 phr.

15. A tire as specified in claim 11 wherein the elongated silica has a length of about 70 nm to about 120 nm.

16. A tire as specified in claim 11 wherein the elongated silica has a length of about 80 nm to about 100 nm.

17. A tire as specified in claim 11 wherein the rubbery polymer is a styrene-butadiene rubber.

18. A tire as specified in claim 11 wherein the silica reinforced rubber composition is further comprised of a silica coupling agent.

19. A tire as specified in claim 11 wherein the silica reinforced rubber composition is further comprised of at least one conventional rubber compounding ingredient selected from the group consisting of carbon black, sulfur, fillers, accelerants, oils, waxes, scorch inhibiting agents, and processing aids.

20. A tire as specified in claim 18 wherein the silica coupling agent is of the structural formula: $Z$-Alk-$S_n$-Alk-$Z$, wherein $Z$ is selected from the group consisting of

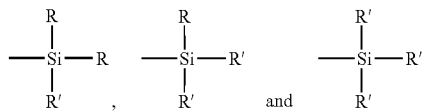

wherein R is an alkyl group of 1 to 4 carbon atoms, a cyclohexyl group or a phenyl group; wherein R' is an alkoxy group containing 1 to 8 carbon atoms or a cycloalkoxy group containing 5 to 8 carbon atoms; and wherein Alk is a divalent hydrocarbon of 1 to 18 carbon atoms, and wherein n represents an integer of 2 to 8 carbon atoms.

* * * * *